(12) United States Patent
Bonn et al.

(10) Patent No.: US 11,736,432 B2
(45) Date of Patent: Aug. 22, 2023

(54) WIRELESS MESSAGING WITH HIGH-PRIORITY QUALITY-OF-SERVICE

(71) Applicant: T-Mobile Innovations LLC, Overland Park, KS (US)

(72) Inventors: Mark J. Bonn, Granite Bay, CA (US); John Tayag Susbilla, Milpitas, CA (US); Kenneth V. George, Houston, TX (US); Muhammad Nauhman Bashir Gora, Irvine, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 11 days.

(21) Appl. No.: 17/459,511

(22) Filed: Aug. 27, 2021

(65) Prior Publication Data
US 2021/0392103 A1    Dec. 16, 2021

Related U.S. Application Data

(63) Continuation of application No. 16/825,510, filed on Mar. 20, 2020, now Pat. No. 11,140,117.

(51) Int. Cl.
| | |
|---|---|
| *H04L 51/226* | (2022.01) |
| *H04L 47/24* | (2022.01) |
| *H04W 28/02* | (2009.01) |
| *H04L 65/80* | (2022.01) |
| *H04L 69/22* | (2022.01) |
| *H04W 4/12* | (2009.01) |
| *H04L 65/1104* | (2022.01) |
| *H04L 67/61* | (2022.01) |

(52) U.S. Cl.
CPC ........ *H04L 51/226* (2022.05); *H04L 47/2458* (2013.01); *H04L 65/1104* (2022.05); *H04L 65/80* (2013.01); *H04L 67/61* (2022.05); *H04L 69/22* (2013.01); *H04W 4/12* (2013.01); *H04W 28/0268* (2013.01)

(58) Field of Classification Search
CPC ... H04L 51/226; H04L 65/1104; H04L 67/61; H04L 47/2458; H04L 65/80; H04L 69/22; H04W 4/12; H04W 28/0268
See application file for complete search history.

(56) References Cited

U.S. PATENT DOCUMENTS

| | | | |
|---|---|---|---|
| 7,773,983 | B2 | 8/2010 | Takeda |
| 8,510,804 | B1 | 8/2013 | Bonn et al. |
| 9,509,723 | B1 | 11/2016 | Khan et al. |
| 9,565,307 | B2 | 2/2017 | Bjorsell et al. |
| 9,585,081 | B2 | 2/2017 | Kim et al. |
| 9,848,058 | B2 | 12/2017 | Johnson et al. |
| 9,942,766 | B1 | 4/2018 | Bonn et al. |
| 10,021,250 | B1 * | 7/2018 | Chen ........................ H04W 4/90 |

(Continued)

*Primary Examiner* — Jerry B Dennison (57) ABSTRACT

A wireless User Equipment (UE) generate a Session Initiation Protocol (SIP) message that comprises a SIP header and a user message. The SIP header indicates a priority QoS and the user message indicates a message destination. The wireless UE wirelessly transfers the SIP message to a wireless network and the wireless network transfers the SIP message to a message network. In response to the priority QoS indicated in the SIP header, the message network generates and transfers another SIP message using the priority QoS. The other SIP message comprises another SIP header and the user message.

20 Claims, 7 Drawing Sheets

(56) References Cited

U.S. PATENT DOCUMENTS

| | | | |
|---|---|---|---|
| 10,361,953 B1 | 7/2019 | Bonn et al. | |
| 10,462,192 B2 | 10/2019 | Liang et al. | |
| 10,484,381 B1 * | 11/2019 | Bonn | H04L 65/1016 |
| 10,715,969 B1 | 7/2020 | Bonn et al. | |
| 11,038,857 B1 * | 6/2021 | Paczkowski | H04L 63/0485 |
| 11,140,117 B1 * | 10/2021 | Bonn | H04W 4/90 |
| 2006/0068761 A1 | 3/2006 | Chambers et al. | |
| 2008/0076386 A1 | 3/2008 | Khetawat et al. | |
| 2014/0128113 A1 | 5/2014 | Zisimopoulos et al. | |
| 2015/0222753 A1 | 8/2015 | Noldus | |
| 2015/0358853 A1 | 12/2015 | Kiss | |
| 2015/0373523 A1 | 12/2015 | Jeong et al. | |
| 2016/0157253 A1 | 6/2016 | Yamine et al. | |
| 2016/0174188 A1 * | 6/2016 | Kim | H04L 65/1045 |
| | | | 455/458 |
| 2016/0219644 A1 | 7/2016 | Zhao et al. | |
| 2016/0295614 A1 | 10/2016 | Lee et al. | |
| 2018/0054721 A1 | 2/2018 | Choe et al. | |
| 2018/0199261 A1 | 7/2018 | Lee et al. | |
| 2019/0075139 A1 * | 3/2019 | Bouvet | H04L 67/1014 |
| 2019/0190775 A1 | 6/2019 | Buckley et al. | |
| 2019/0281506 A1 | 9/2019 | Chiang et al. | |
| 2020/0068431 A1 | 2/2020 | Han et al. | |
| 2020/0120629 A1 * | 4/2020 | Christopher | H04W 8/26 |
| 2020/0236731 A1 | 7/2020 | Jung et al. | |
| 2021/0029659 A1 | 1/2021 | Rahman et al. | |
| 2021/0044633 A1 * | 2/2021 | John | H04L 65/1104 |
| 2021/0068036 A1 | 3/2021 | Chun | |
| 2021/0092668 A1 | 3/2021 | Zaus et al. | |
| 2021/0126959 A1 * | 4/2021 | John | H04L 65/1046 |
| 2021/0392103 A1 * | 12/2021 | Bonn | H04L 51/58 |
| 2022/0210675 A1 * | 6/2022 | Cui | H04W 36/0088 |

* cited by examiner

FIGURE 7

WIRELESS MESSAGING WITH HIGH-PRIORITY QUALITY-OF-SERVICE

RELATED CASES

This United States Patent Application is a continuation of U.S. patent application Ser. No. 16/825,510 that was filed on Mar. 20, 2020 and is entitled "WIRELESS MESSAGING WITH HIGH-PRIORITY QUALITY-OF-SERVICE." U.S. patent application Ser. No. 16/825,510 is hereby incorporated by reference into this United States Patent Application.

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless user devices are often used to transmit and receive short data messages. To serve the data messaging, the wireless communication networks deploy Internet Protocol Multimedia Subsystems (IMS) to handle the short data massaging. A popular form of data messaging served by IMS comprises Internet Protocol Short Messaging (IPSM). The wireless user devices exchange short IP messages over the wireless access nodes and the IMS. The wireless user devices and the IMS often use Session Initiation Protocol (SIP) as a signaling protocol within an IP wrapper for the data message.

Wireless Priority Service (WPS) is a government mandated wireless communication service for critical personnel like first responders. WPS allows and maintains wireless communication quality for the critical personnel during network overloads. WPS devices use a special WPS access class to avoid access delays during the network overloads. WPS devices use a special Quality-of-Service (QoS) and resource priority to avoid message discard or delay during the network overloads. Unfortunately, WPS call origination remains open to attack by malicious devices that may illegitimately obtain WPS QoS and diminish the WPS QoS of legitimate WPS devices.

TECHNICAL OVERVIEW

A wireless User Equipment (UE) generate a Session Initiation Protocol (SIP) message that comprises a SIP header and a user message. The SIP header indicates a priority QoS and the user message indicates a message destination. The wireless UE wirelessly transfers the SIP message to a wireless network and the wireless network transfers the SIP message to a message network. In response to the priority QoS indicated in the SIP header, the message network generates and transfers another SIP message using the priority QoS. The other SIP message comprises another SIP header and the user message.

DETAILED DESCRIPTION

Figure 1:
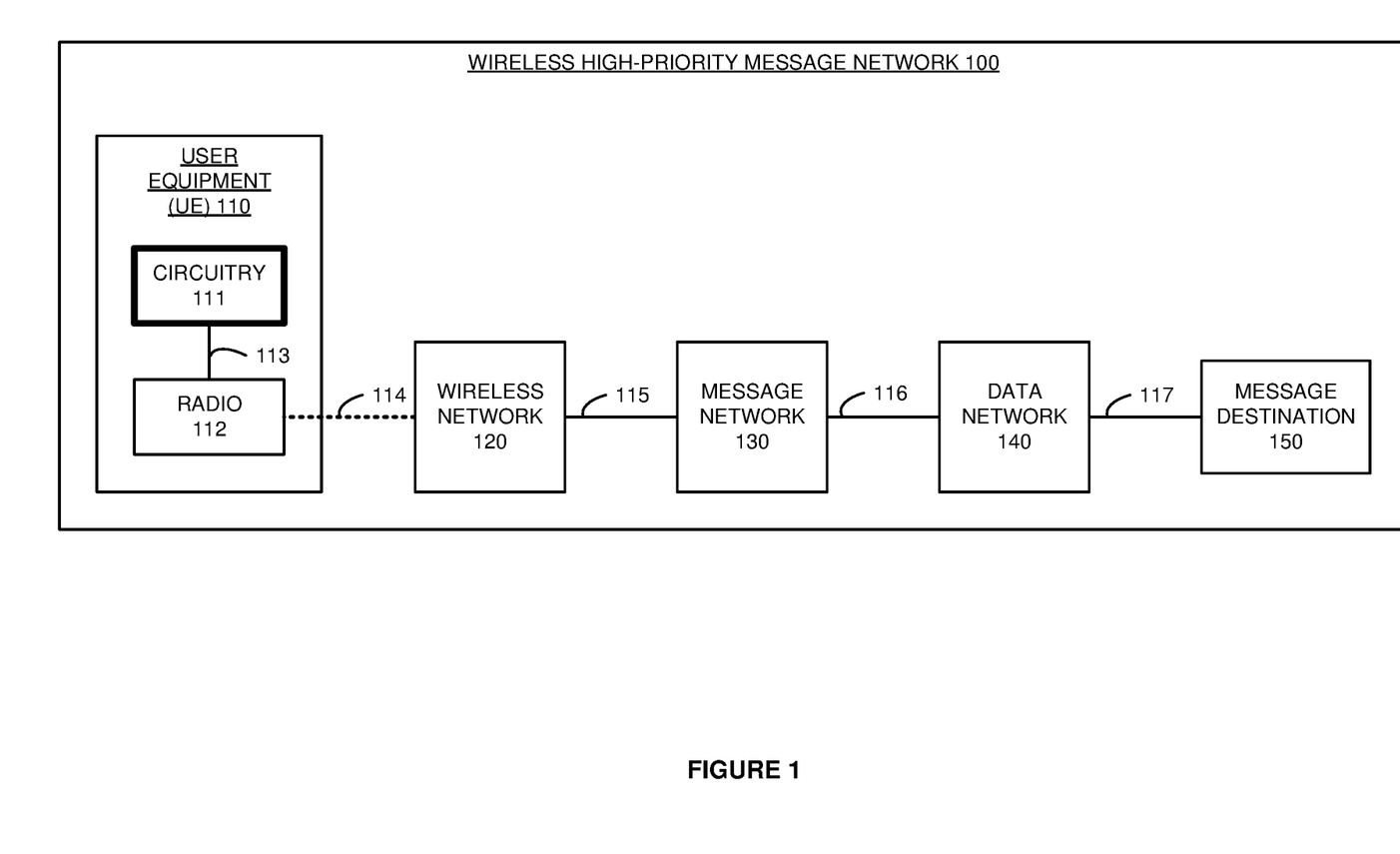
FIG. 1 illustrates a wireless communication network that transfers high-priority messages for wireless User Equipment (UEs) using high-priority message Quality-of-Service (QoS).

FIG. 1 illustrates wireless communication network 100 that transfers high-priority messages for wireless User Equipment (UE) 110 using high-priority message Quality-of-Service (QoS). Wireless communication network 100 comprises wireless UE 110, wireless network 120, message network 130, data network 140, and message destination 150. UE 110 might be a phone, computer, robot, vehicle, or some other data appliance with wireless communication circuitry. In some examples, the enhanced QoS comprises priority access to wireless network 120, overload exemptions in wireless network 120, and overload exemptions in message network 130. The priority access enables immediate wireless connectivity for high-priority messaging when other UEs may be temporarily denied wireless access. The overload exemption enables the prompt delivery of high-priority messages during message overloads when other UE messages may be discarded or significantly delayed. In some examples, the enhanced QoS may comprise Wireless Priority Service (WPS) QoS.

Radio 112 and wireless network 120 wirelessly communicate over wireless data link 114. Wireless data link 114 uses Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless communication protocol. Wireless network 120 and message network 130 communicate over data link 115, and message network 130 and data network 140 communicate over data link 116. Data network 140 and message destination 150 communicate over data link 117. Data links 115-117 use IEEE 802.3 (Ethernet), Time Division Multiplex (TDM), Data Over Cable System Interface Specification (DOCSIS), Internet Protocol (IP), 5GNR, 5G Core (5GC), LTE, WIFI, virtual switching, inter-processor communication, bus interfaces, and/or some other data communication protocol.

UE 101 comprises circuitry 111 and radio 112 which are coupled over data link 113. Circuitry 111 comprises one or more microprocessors, memories, software, transceivers, and bus circuitry, and the like. Radio 112 comprises one or more antennas, filters, amplifiers, analog-to-digital interfaces, microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, user applications, and network applications. Data link 113 comprises a virtual switch, inter-processor communication, bus interface, Ethernet link, IP connection, and/or some other data communication interface.

Wireless network 120 comprises radios, baseband units, network controllers, databases, packet routers, and/or some other networking circuitry. Message network 130 comprises Internet Protocol Multimedia Subsystem (IMS) servers, databases, message servers, and/or the like. Data network 140 comprises network controllers, databases, packet routers, and/or some other networking circuitry. Data network 140 may include another wireless network and/or message network. Message destination 150 comprises an apparatus with data communication circuitry like a computer, phone, robot, vehicle, or database. Networks 120, 130, and 140 as well as destination 150 comprise microprocessors, memories, software, transceivers, and bus circuitry, and the like. The microprocessors comprise DSP, CPUs, GPUs, ASICs, and/or the like. The memories comprise RAM, flash circuitry, disk drives, and/or the like. The memories store software like operating systems, user applications, and network applications.

In normal scenarios, circuitry 111 receives a request for standard messages. The standard messages are neither high-priority messages nor emergency messages. For example, a user application may automatically generate a regularly-scheduled and situation-normal status report. A human operator may input a humorous observation over a touch display. In response to the standard message request, circuitry 111 signals radio 112 to wirelessly attach to wireless network 120 using a standard Establishment Cause like Mobile-Originated (MO) signaling or the like. Circuitry 111 also generates a Session Initiation Protocol (SIP) message in response to the standard request. The SIP message includes the standard message. Radio 112 wirelessly attaches to wireless network 120 using the standard Establishment Cause. Radio 112 wirelessly transfers the SIP message that includes the standard message to wireless network 120. Wireless network 120 network transfers the SIP message to message network 130 using a standard QoS responsive to the standard Establishment Cause that was used for wireless attachment. Due to the standard QoS, wireless network 120 may deny wireless attachment or delay/discard the standard message during overloads. Message network 130 transfers the standard message to data network 140 using the standard QoS. Message network 130 may delay/discard the standard message during overloads. Data network 140 transfers the standard message to message destination 150—typically using a standard QoS. Message destination 150 handles the standard message—typically using a standard QoS.

In high-priority scenarios, circuitry 111 receives a request for a high-priority message. For example, a user application may automatically generate the WPS message responsive to a radio-active sensor in UE 110 detecting excessive levels of radiation. A human operator may input a public safety message over a touch display. In response to the high-priority message request, circuitry 111 signals radio 112 to wirelessly attach to wireless network 120 using a high-priority-attachment Establishment Cause. Circuitry 111 also generates a SIP message in response to the request. The SIP message includes the high-priority message that is typically addressed to a high-priority destination like the WPS *272 prefix. Importantly, the SIP message also indicates the high-priority-attachment Establishment Cause that was just used for the wireless attachment to wireless network 120. Radio 112 wirelessly attaches to wireless network 120 using the high-priority-attachment Establishment Cause. Radio 112 wirelessly transfers the SIP message that indicates the high-priority-attachment Establishment Cause and that includes the high-priority message to wireless network 120. Wireless network 120 network transfers the SIP message to message network 120 using the high-priority QoS responsive to the high-priority-attachment Establishment Cause that was used during the recent wireless attachment. Due to the high-priority QoS, wireless network 120 will not deny wireless attachment or delay/discard the high-priority message during overloads. Message network 130 transfers the high-priority message to data network 140 using the high-priority QoS responsive to the high-priority-attachment Establishment Cause in the SIP message and possibly a high-priority destination number or a network routing priority in the high-priority message. Message network 130 will not delay/discard the high-priority message during overloads. Data network 140 transfers the high-priority message to message destination 150—possibly using the high-priority QoS responsive to high-priority QoS marks in the high-priority message or in another SIP message that encapsulates the high-priority message. Message destination 150 handles the high-priority message—possibly using the high-priority QoS responsive to the high-priority QoS marks in the high-priority message or in the other SIP message that encapsulates the high-priority message.

In emergency scenarios, circuitry 111 receives a request for an emergency message. For example, a user application may automatically generate the emergency message responsive to a violent car accident that includes UE 110. A human operator may input an emergency 911 message over a touch display when having severe chest pains. In response to the emergency request, circuitry 111 signals radio 112 to wirelessly attach to wireless network 120 using the emergency Establishment Cause. Circuitry 111 also generates a SIP message in response to the emergency request. The SIP message includes the emergency message which is addressed to an emergency destination number like 911. Radio 112 wirelessly attaches to wireless network 120 using the emergency Establishment Cause. Radio 112 wirelessly transfers the SIP message that includes the emergency message to wireless network 120. Wireless network 120 network transfers the SIP message to message network 120 using an emergency QoS responsive to the emergency Establishment Cause that was used during the recent wireless attachment. Due to the emergency QoS, wireless network 120 will not delay/discard the emergency message during overloads. Message network 130 transfers the emergency message to data network 140 using the emergency QoS responsive to the emergency destination address. Message network 130 will not delay/discard the emergency message during overloads. Data network 140 transfers the emergency message to message destination 150 using the emergency QoS responsive to emergency QoS marks in the high-priority message or in another SIP message that encapsulates the emergency message. Message destination 150 handles the emergency message using the emergency QoS—possibly responsive to emergency QoS marks in the emergency message or in the other SIP message that encapsulates the emergency message. In emergency scenarios, message destination 150 is usually a Public Safety Answering Point (PSAP).

In some examples, the emergency Establishment Cause can be used instead of the high-priority-attachment Establishment Cause to trigger high-priority QoS. The emergency Establishment Cause could be used for high-priority wireless attachment to receive enhanced QoS in wireless network 120. The emergency Establishment Cause could be placed in the high-priority SIP message to trigger the high-priority QoS in message network 130. In these high-priority scenarios that use the Emergency Establish Cause, message network 130 distinguishes between a high-priority message and an emergency message based on the destination number of the message. For example, an emergency message would be addressed to "911" or "EMERGENCY" and a high-priority message would be addressed to "*272" or "WPS" followed by a destination number.

In some examples, the high-priority-attachment Establishment Cause is also used for WPS voice or video calls. On a WPS voice/video call from UE 110, circuitry 111 generates a SIP INVITE message to place the call that includes the *272 WPS calling prefix and the high-priority-attachment Establishment Cause. Message network 130 uses both the *272 WPS calling prefix and the high-priority-attachment Establish Cause to distinguish between a high-priority message and a malicious message. Message network 130 handles the high-priority messages with high-priority QoS. Message network 130 discards malicious messages that omit either the *272 WPS calling prefix or the high-priority-attachment Establish Cause.

Figure 2:
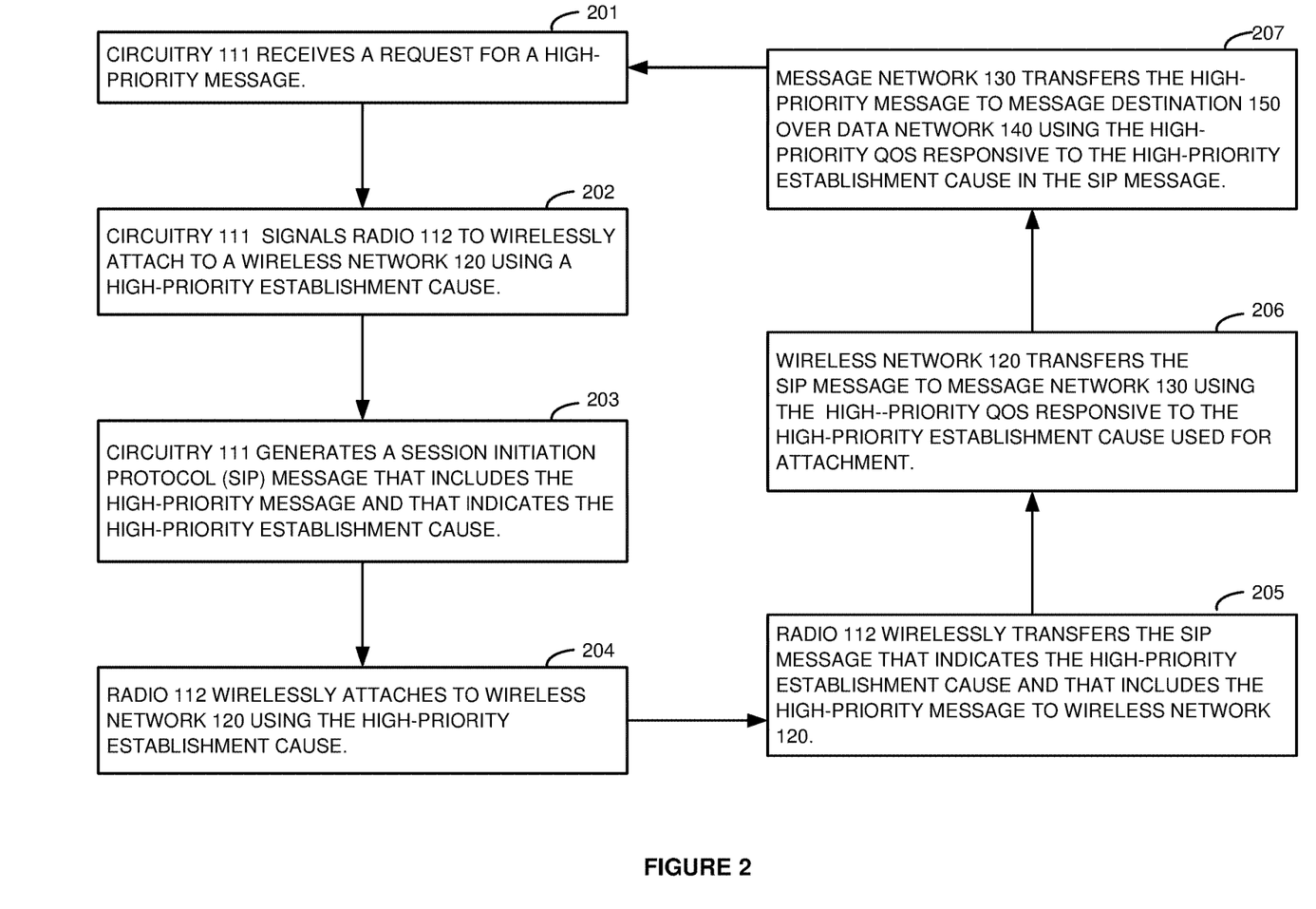
FIG. 2 illustrates the operation of the wireless communication network to transfer the high-priority messages for the wireless UE using the high-priority QoS.

FIG. 2 illustrates the operation of wireless communication network 100 to transfer the high-priority messages for wireless UE 110 using the high-priority QoS. Circuitry 111 receives a request for a high-priority message (201). In response to the high-priority request, circuitry 111 signals radio 112 to wirelessly attach to wireless network 120 using a high-priority-attachment Establishment Cause (202). Circuitry 111 also generates a SIP message in response to the request, and the SIP message includes the high-priority message and indicates the high-priority-attachment Establishment Cause that was recently used for attachment to wireless network 120 (203). Radio 112 wirelessly attaches to wireless network 120 using the high-priority-attachment Establishment Cause (204). Radio 112 wirelessly transfers the SIP message that indicates the high-priority-attachment Establishment Cause and that includes the high-priority message to wireless network 120 (205). Wireless network 120 network transfers the SIP message to message network 120 using the high-priority QoS responsive to the high-priority-attachment Establishment Cause that was used during the recent wireless attachment (206). Message network 130 transfers the high-priority message to data network 140 using the high-priority QoS responsive to the high-priority-attachment Establishment Cause in the SIP message and the high-priority destination number in the high-priority message (207). Data network 140 transfers the high-priority message to message destination 150, and message destination 150 handles the high-priority message. The operation repeats (201).

Figure 3:
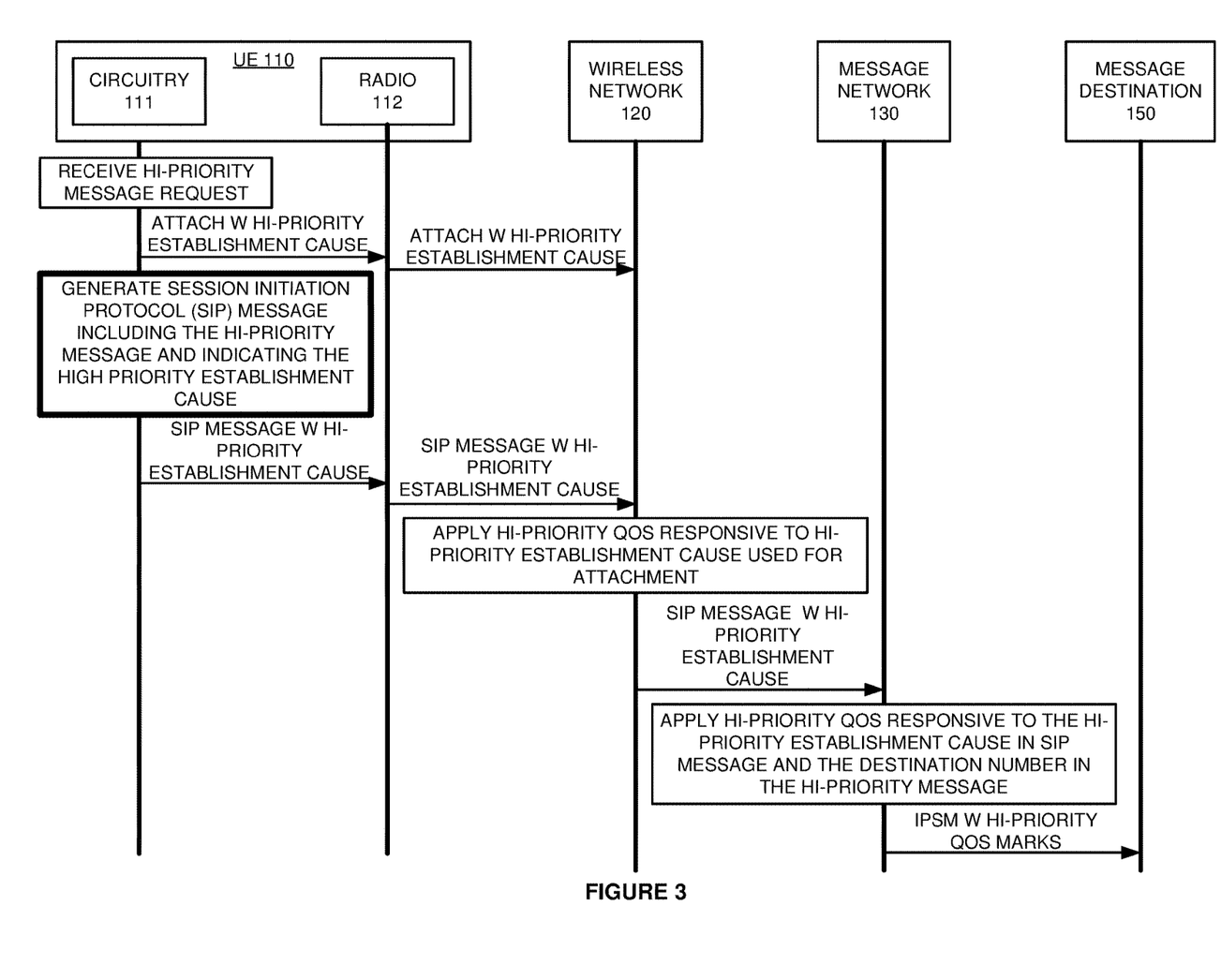
FIG. 3 illustrates the operation of the wireless communication network to transfer high-priority messages for the wireless UE using the high-priority QoS.

FIG. 3 illustrates the operation of wireless communication network 100 to transfer the high-priority messages for wireless UE 110 using the high-priority QoS. Circuitry 111 receives a request for a high-priority message and signals radio 112 to wirelessly attach to wireless network 120 using a high-priority-attachment Establishment Cause. Radio 112 wirelessly attaches to wireless network 120 using the high-priority-attachment Establishment Cause. Circuitry 111 generates a SIP message in response to the high-priority request. The SIP message includes the high-priority message that is typically addressed to a high-priority destination. Importantly, the SIP message indicates the high-priority-attachment Establishment Cause that was recently used for attachment to wireless network 120. Radio 112 wirelessly transfers the SIP message that indicates the high-priority-attachment Establishment Cause and that includes the high-priority message to wireless network 120. Wireless network 120 applies high-priority QoS to the SIP message to responsive to the high-priority-attachment Establishment Cause used for attachment. Wireless network 120 transfers the SIP message to message network 130. Message network 130 applies the high-priority QoS to the SIP message responsive to the high-priority-attachment Establishment Cause in the SIP message and the high-priority destination number in the high-priority message. Message network 130 transfers an Internet Protocol Short Message to (IPSM) to data network 140 that includes high-priority QoS marks and that includes the high-priority message. In some examples, the IPSM is encapsulated in another SIP message that is addressed to destination 150 and that includes the high-priority-attachment Establishment Cause. Data network 140 transfers the IPSM to message destination 150 using the high-priority QoS responsive to the high-priority QoS marks and/or the high-priority-attachment Establishment Cause.

Figure 4:
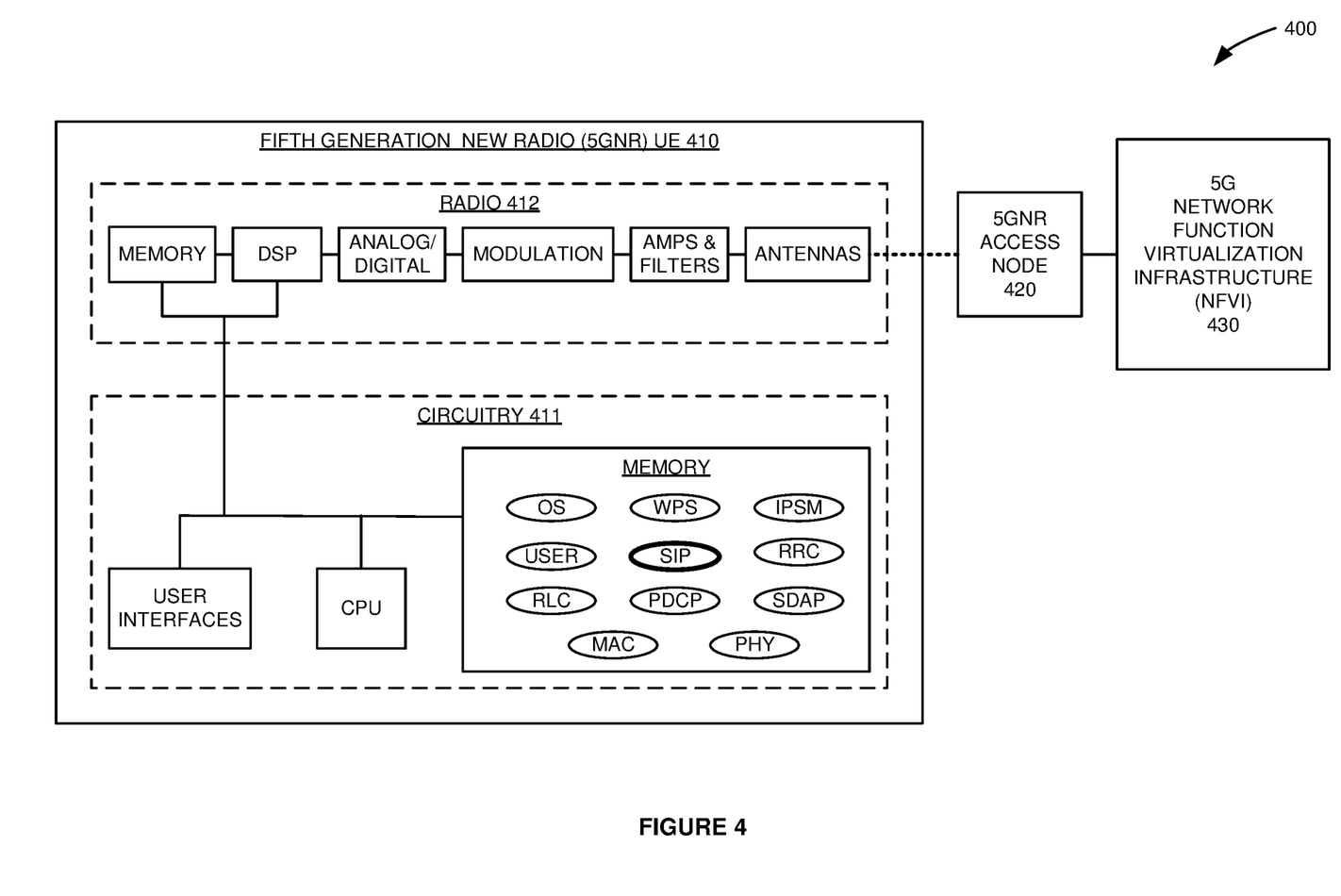
FIG. 4 illustrates a Fifth Generation New Radio (5GNR) User Equipment (UE) that transfers Wireless Priority Service (WPS) messages using WPS QoS.

FIG. 4 illustrates a Fifth Generation New Radio (5GNR) User Equipment (UE) 410 that transfers Wireless Priority Service (WPS) messages using WPS QoS. 5G network 400 is an example of wireless communication network 100, although network 100 may differ. 5G network 400 comprises 5GNR UE 410, 5GNR access node 420, and 5GC Network Function Virtualization Infrastructure (NFVI) 430. 5GNR UE 410 is an example of UE 110, although UE 110 may differ. 5GNR UE 410 comprises circuitry 411 and radio 412 which are coupled over bus circuitry. Circuitry 411 comprises user interfaces, CPU, and memory that are coupled over bus circuitry. Radio 412 comprises antennas, amplifiers, filters, modulation, analog-to-digital interfaces, DSP, and memory that are coupled over bus circuitry. The antennas in radio 412 are wirelessly coupled to 5GNR access node 420 which is coupled to 5GC NFVI 430.

The user interfaces in circuitry 411 comprise graphic displays, machine controllers, sensors, cameras, transceivers, and/or some other user components. The memory in circuitry 411 stores an operating system (OS), user applications (USER), and network applications. The network applications comprise software for Wireless Priority Service (WPS), Internet Protocol Short Messaging (IPSM), Session Initiation Protocol (SIP), Physical Layer (PHY), Media Access Control (MAC), Radio Link Control (RLC), Packet Data Convergence Protocol (PDCP), Radio Resource Control (RRC), and Service Data Adaptation Protocol (SDAP). The CPU in circuitry 411 executes the operating system and the user applications to generate and consume user data. The CPU in circuitry 411 executes the operating system and the network applications to wirelessly exchange corresponding 5GNR signaling and 5GNR data with 5GNR access node 420 over radio 412.

In radio 412, the antennas receive wireless 5GNR signals from 5GNR access node 420 that transport Downlink (DL) 5GNR signaling and DL 5GNR data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL 5GNR symbols from the DL digital signals and transfers the DL symbols to circuitry 411. The CPU in circuitry 411 executes network applications to process the DL 5GNR symbols and recover the DL 5GNR signaling and the DL 5GNR data. The network applications transfer corresponding DL user data to the user applications over the operating system.

The network applications process the DL 5GNR signaling and user requirements to generate Uplink (UL) 5GNR signaling. The user applications transfer UL user data to the network applications over the operating system. The network applications process the UL 5GNR signaling and the UL user data to generate corresponding UL 5GNR symbols. The network applications transfer the UL 5GNR symbols to the DSP in radio 412. In radio 412, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling and corresponding UL 5GNR data to 5GNR access node 420.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In circuitry 411, the RRC stores the WPS Access Class in the memory. In response to power-up, the RRC exchanges 5GNR signaling with 5GNR access node 420 and 5G NFVI 430 to establish an Internet Multimedia Subsystem (IMS) bearer between 5GNR UE 410 and a Proxy Call State Control Function (P-CSCF) in 5G NFVI 430. During wireless attachment, the WPS Access Class in UE 410 precludes a congestion-caused back-off instruction from 5GNR access node 420. The SIP application in circuitry 411 interacts with the P-CSCF in NFVI 430 over the IMS bearer to register 5GNR UE 410 with the IMS.

Subsequently, the WPS application in circuitry 411 generates a WPS message—typically in response to human interaction with the user interfaces. To generate the WPS message, the WPS application launches the IPSM application, and the IPSM application interacts with the user over the user interfaces to generate a WPS IPSM having the WPS message. The WPS IPSM is addressed from the Mobile Identification Number (MIN) of 5GNR UE 410 to the WPS prefix "*272" and then a destination number. The IPSM application transfers the WPS IPSM to the SIP application. The SIP application detects the WPS IPSM based on the *272 prefix in the destination address.

In response to the WPS IPSM, the SIP application directs the RRC to wirelessly attach 5GNR UE 410 to 5GNR access node 420 using a WPS high-priority-attachment Establishment Cause and a WPS Access Class. The SIP application retrieves the WPS Access Class from the memory, and the WPS Access Class may be 14. The SIP application generates a SIP INVITE message that has the WPS IPSM. The SIP application adds a P-Access-Network-Info (PANI) header to the SIP message that indicates the WPS high-priority-attachment Establishment Cause and the WPS Access Class. The PANI header may also identify 5GNR access node 420, 5GNR technology access, and the like. The SIP application transfers the WPS SIP message to the SDAP. The RRC directs the wireless attachment of UE 410 over radio 412 to 5GNR access node 420 using the WPS high-priority-attachment Establishment Cause. After wireless attachment, the SDAP transfers the WPS SIP message to radio 412 over the PDCP, RLC, MAC, and PHY. Radio 412 transfers the WPS SIP message to 5GNR access node 420 over the IMS bearer. 5GNR access node 420 transfers the WPS SIP message to the P-CSCF in 5G NFVI 430 over the IMS bearer.

Figure 5:
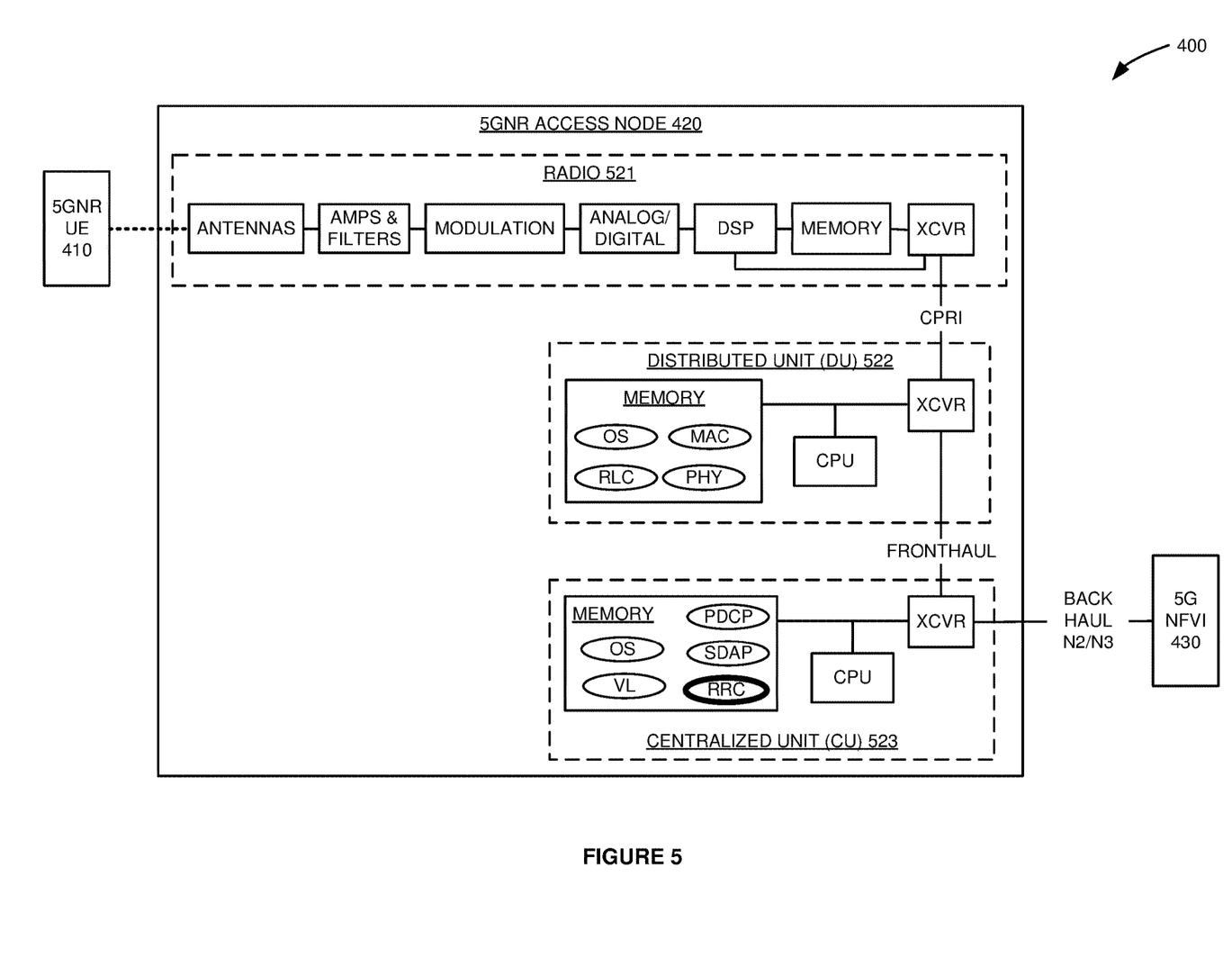
FIG. 5 illustrates a 5GNR wireless access node that transfers the WPS messages for the 5GNR UE using the WPS QoS.

FIG. 5 illustrates 5GNR wireless access node 420 that transfers the WPS messages for 5GNR UE 401 using the WPS QoS. 5GNR access node 420 is an example access nodes in wireless network 120, although wireless network 120 may differ. 5GNR access node 420 comprises radio 521, Distributed Unit (DU) 522, and Centralized Unit (CU) 523. Radio 521 comprises antennas, amplifiers, filters, modulation, analog-to-digital interfaces, DSP, and memory that are coupled over bus circuitry. DU 522 comprises memory, Central Processing Units (CPU), and transceivers (XCVR) that are coupled over bus circuitry. CU 523 comprises memory, CPU, and transceivers that are coupled over bus circuitry.

5GNR UE 410 is wirelessly coupled to the antennas in radio 521 over 5GNR links. The radio transceivers are coupled to the DU transceivers over Common Public Radio Interface (CPRI) links. The DU transceivers are coupled to the CU transceivers over fronthaul links. The CU transceivers are coupled to 5G NFVI 430 over backhaul links that carry N2 signaling and N3 data. The DU memory stores an operating system, PHY, MAC, and RLC. The CU memory stores an operating system, virtual layer (VL), PDCP, RRC, and SDAP. The virtual layer comprises hypervisor modules, virtual switches, virtual CPUs, and/or the like. The CPU in CU 523 executes the PDCP, RRC, and SDAP to drive the exchange of N3 data and N2 signaling between 5G NFVI 430 and DU 522. The CPU in DU 522 executes the PHY, MAC, and RLC to drive the transfer of data and signaling between CU 523 and 5GNR UE 410. The functionality split of the network applications (PHY, MAC, RLC, PDCP, RRC, SDAP) between DU 522 and CU 523 may vary.

In radio 521, the antennas receive wireless 5GNR signals from 5GNR UE 410 that transport UL 5GNR signaling and UL 5GNR data. The UL 5GNR signaling may include a WPS high-priority-attachment Establishment Cause and the UL 5GNR data may include a SIP message that carries a WPS IPSM and the WPS high-priority-attachment Establishment Cause. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL 5GNR symbols from the UL digital signals. In DU 522 and CU 523, the CPUs execute the network applications to process the UL 5GNR symbols and recover the UL 5GNR signaling and UL 5GNR data. In CU 413, the CPU executes the RRC to process the UL 5GNR signaling and DL N2 signaling to generate new UL N2 signaling and new DL 5GNR signaling. The SDAP interworks between 5GNR data and N3 data for the UL and DL. The RRC transfers the new UL N2 signaling to Access and Mobility Management Functions (AMFs) in 5G NFVI 430 over the backhaul links. The SDAP transfers the UL N3 data to User Plane Functions (UPFs) in 5G NFVI 430 over the backhaul links. The UL N3 data may include a SIP message that carries a WPS IPSM and the WPS high-priority-attachment Establishment Cause.

The transceivers in CU 523 receive the DL N2 signaling from the AMFs and receive the DL N3 data from the UPFs in 5G NFVI 430. CU 523 and DU 522 execute the network applications to process the new DL N2 signaling and the DL N3 data to generate corresponding DL 5GNR symbols that carry corresponding DL 5GNR signaling and 5GNR N3 data. In radio 521, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 410.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

When the CPUs, memories, or other circuitry overload in 5GNR access node 420, the RRC in CU 523 signals back-off instructions to some UE Access Classes, but the RRC does not back-away the WPS Access Class that in 5GNR UE 410. The RRC in 5GNR access node 420 interacts with the RRC in 5GNR UE 410 over RRC signaling. The RRC in 5GNR access node 420 interacts with the AMF in 5G NFVI 430 over N2 signaling. The RRC in 5GNR access node 420 receives 5GNR attachment signaling from 5GNR UE 410 that indicates the high-priority-attachment Establishment Cause. The RRC in 5GNR access node 420 then transfers an N2 message to the AMF in 5G NFVI for UE authorization. The AMF authorizes 5GNR UE 410 and directs the creation of an IMS bearer over 5GNR access node 420 between 5GNR UE 410 and a Proxy Call State Control Function (P-CSCF) in NFVI 430. The SDAP in 5GNR access node 420 exchanges SIP messages between 5GNR UE 410 and the P-CSCF in 5G NFVI 430 over the IMS bearer. To serve the WPS QoS responsive to the high-priority-attachment Establishment Cause, the RRC does not discard or significantly delay high-priority messages during overloads.

Figure 6:
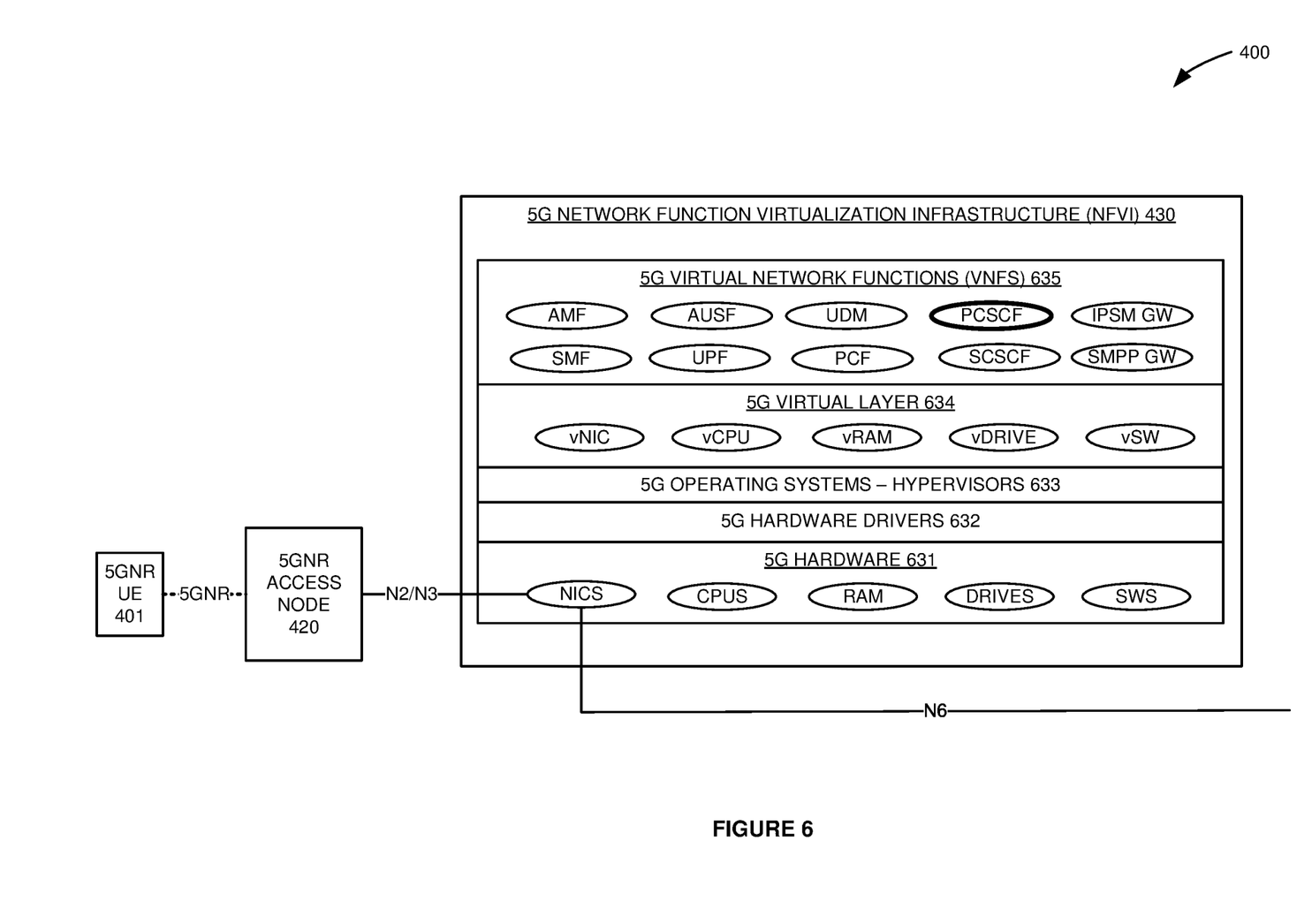
FIG. 6 illustrates a 5G Network Function Virtualization Infrastructure (NFVI) that transfers the WPS messages for the 5GNR UE using the WPS QoS.

FIG. 6 illustrates 5G Network Function Virtualization Infrastructure (NFVI) 430 that transfers the WPS messages for 5GNR UE 401 using the WPS QoS. 5G NFVI 420 is an example of wireless network 120 and message network 130, although networks 120 and 130 may differ. 5G NFVI 420 comprises 5G hardware 631, 5G hardware drivers 632, 5G operating systems and hypervisors 633, 5G virtual layer 634, and 5G Virtual Network Functions (VNFs) 635. 5G hardware 631 comprises Network Interface Cards (NICs), CPUs, RAM, flash/disk drives, and data switches (SWS). 5G virtual layer 634 comprises virtual NICs (vNIC), virtual CPUs (vCPU), virtual RAM (vRAM), virtual Drives (vDRIVE), and virtual Switches (vSW). The NICs are coupled to 5GNR access node 420 over the N2/N3 backhaul links. The NICs are linked to external systems over N6 links.

5G VNFs 635 comprise Access and Mobility Management Functions (AMF), Authentication and Security Functions (AUSF), Unified Data Management (UDM), Session Management Functions (SMF), User Plane Functions (UPF), Policy Control Functions (PCF), Proxy Call State Control Functions (P-CSCFs), Serving Call State Control Functions (S-CSCFs), Internet Protocol Short Message Gateways (IPSM GW), and Short Message Peer-to-Peer Gateways (SMPP GWs). Other 5G network functions are typically present but are omitted for clarity. 5G hardware 631 executes 5G hardware drivers 632, 5G operating systems and hypervisors 633, 5G virtual layer 634, and 5G VNFs 635 to serve the 5GNR UE 401 with enhanced WPS messaging over 5GNR access node 420.

During the wireless attachment of 5GNR UE 410, the AMF exchanges N2 signaling with 5GNR access node 420. The AMF interacts with the AUSF, UDM, SMF, and PCF to authenticate, authorize, and select an IMS bearer for 5GNR UE 410. The SMF signals the UPF to support the IMS bearer between 5GNR UE 410 and the P-CSCF. The UPF receives SIP messages from 5GNR UE 401 over the IMS bearer. Some SIP messages include IPSMs, and some of these IPSMs are WPS IPSMs that are addressed to *272. Importantly, the SIP message indicate the WPS high-priority-attachment Establishment Cause and the WPS access class in a PANI header along with a 5GNR technology indicator and a cell ID for 5GNR access node 420.

The P-CSCF receives the SIP message, and in response to the *272 prefix, the P-CSCF checks the PANI header for the WPS high-priority-attachment Establishment Cause and for the WPS Access Class. When the PANI header has the correct WPS high-priority-attachment Establishment Cause and WPS Access Class, the P-CSCF adds a WPS header to the WPS SIP message. The added WPS header uses a namespace like "ets.0" to indicate WPS and preclude overload-based message discard/delay. The P-CSCF also adds a Differentiated Services Control Protocol (DSCP) mark like "DSCP=40" to apply WPS QoS in the IMS elements like the P-CSCF, S-CSCF, IPSM GW, and SMPP GW. The P-CSCF transfers the WPS SIP message to the S-CSCF. The S-CSCF transfers the WPS SIP message to the IPSM GW.

To deliver the WPS IPSM, the IPSM GW generates a new SIP message that is addressed to the destination. The new SIP message also has the WPS IPSM, the WPS header (namespace=ets.0), and the QoS mark (DSCP=40). The new SIP message may have a PANI header with the WPS high-priority-attachment Establishment Cause and the WPS Access Class. The IPSM GW transfers the new SIP message to the SMPP GW. The SMPP GW VNF transfers the new SIP message over the N6 link to another IMS for delivery over another SMPP GW, IPSM GW, S-CSCF, and P-CSCF. The other IMS handles the new SIP message with WPS QoS based on the priority header and the DHCP mark. The other IMS also handles SIP responses to the SIP message with WPS QoS based on the priority header and the DHCP mark in the SIP responses.

Figure 7:
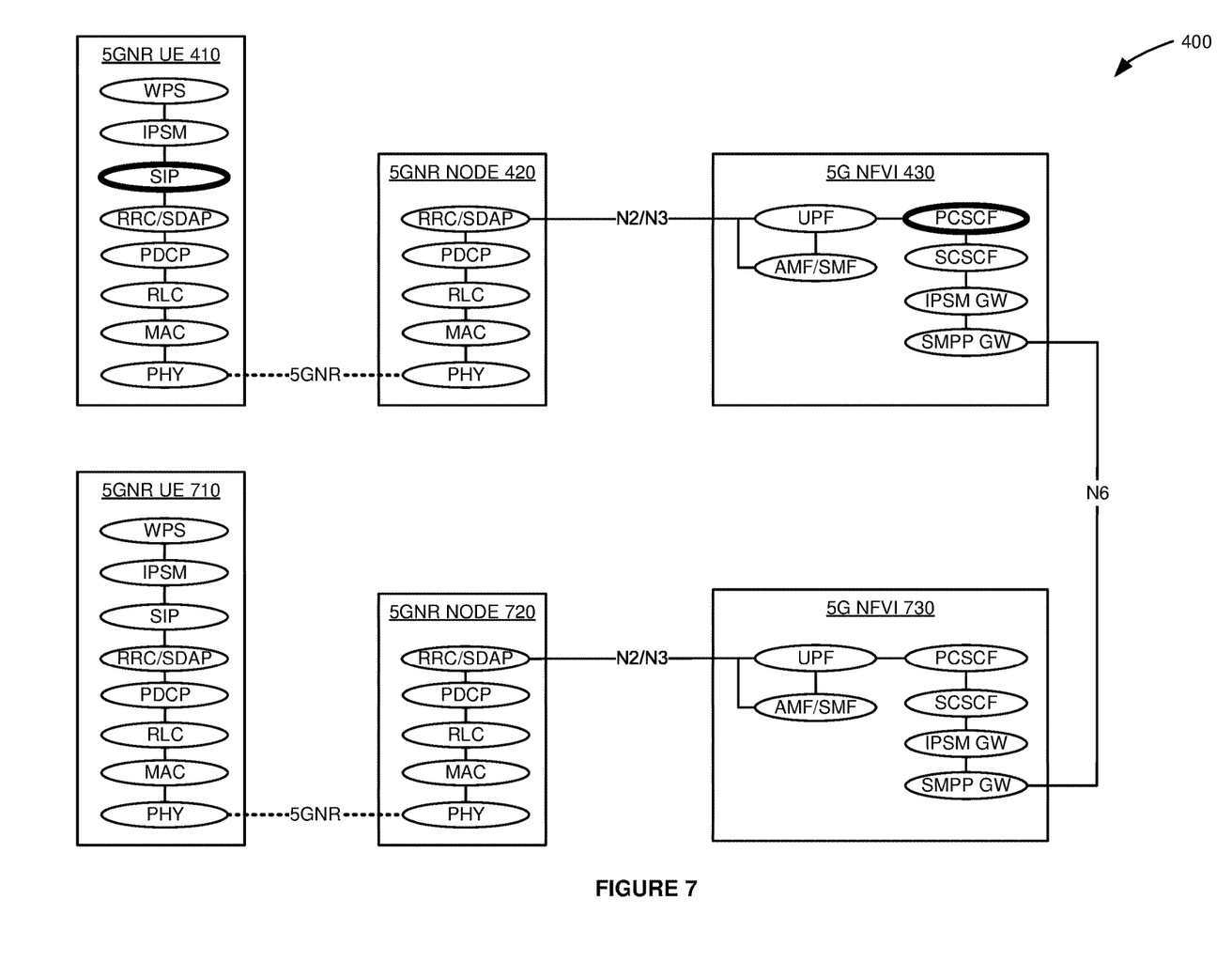
FIG. 7 illustrates the operation of a 5G network to transfer the WPS messages for the 5GNR UE using the WPS QoS.

FIG. 7 illustrates the operation of 5G network 400 to transfer the WPS messages for 5GNR UE 410 using the WPS QoS. 5G network 400 also comprises 5GNR UE 710, 5GNR access node 720, and 5G NFVI 730 which are similar to 5GNR UE 410, 5GNR access node 420, and 5G NFVI 430. In 5GNR UE 410, the RRC exchanges network signaling with the RRC/SDAP in 5GNR access node 420 over their PDCPs, RLCs, MACs, and PHYs. The RRC in 5GNR access node 420 exchanges N2 signaling with the AMF in NFVI 430. The RRCs and the AMF establish the IMS bearer between the SDAP in 5GNR UE 410 and the P-CSCF in 5G NFVI 430. The SIP application in 5GNR UE 410 interacts with the P-CSCF in NFVI 430 over the IMS bearer to register 5GNR UE 410 with the IMS in NFVI 430.

In 5GNR UE 710, the RRC exchanges network signaling with the RRC/SDAP in 5GNR access node 720 over their PDCPs, RLCs, MACs, and PHYs. The RRC in access node 721 exchanges N2 signaling with the AMF in NFVI 730. The RRCs and AMF establish an IMS bearer between the SDAP in 5GNR UE 710 and a P-CSCF in 5G NFVI 730. The SIP application in 5GNR UE 710 interacts with the P-CSCF in NFVI 730 over the IMS bearer to register 5GNR UE 710 with the IMS in NFVI 730. Eventually, 5GNR UE 410 goes idle and detaches from 5GNR access node 420.

In 5GNR UE 410, the WPS application uses the IPSM application to generate an IPSM that is addressed to *272 and has a WPS message for delivery to 5GNR UE 710. The IPSM application transfers the IPSM to the SIP application. The SIP application retrieves the WPS Access Class from the memory. The SIP application generates a SIP message that is addressed to the P-CSCF, encapsulates the WPS IPSM, and includes the PANI header that indicates the WPS high-priority-attachment Establishment Cause and the WPS Access Class. The SIP application transfers the SIP message to the SDAP and signals the RRC to attach using the WPS high-priority-attachment Establishment Cause.

For wireless attachment, the RRC in 5GNR UE 410 selects a random access preamble and wirelessly transmits the random access preamble and a temporary UE ID to the RRC in 5GNR access node 420. The RRC in access node 420 wirelessly transfers a random access response to the RRC in UE 410 that has the temporary UE ID, another UE-ID, a timing advance, and an uplink resource grant. The RRC in 5GNR UE 410 wirelessly transfers an RRC connection request to the RRC in 5GNR access node 420 over the uplink resource that has the other UE ID and the WPS high-priority-attachment Establishment Cause. In response to the RRC connection request, the RRC in access node 420 wirelessly transfers an RRC connection set-up to the RRC in 5GNR UE 410 that has instructions for power, RLC, and a signaling bearer. The RRC in 5GNR UE 410 wirelessly transfers an RRC connection set-up complete message to the RRC in access node 420. The SDAP in UE 410 then transfers the SIP message having the WPS IPSM over the IMS bearer to the SDAP in 5GNR access node 420. The SDAP in 5GNR access node 420 transfers the SIP message having the WPS IPSM over the IMS bearer to the P-CSCF in 5G NFVI 430.

The P-CSCF in 5G NFVI 430 receives the SIP message and adds a WPS header responsive to the *272 destination prefix in the IPSM. The P-CSCF uses the namespace "ets.X and wps.Y" to indicate WPS and preclude overload discard/delay. The P-CSCF adds a DSCP mark to apply the WPS QoS in IMS backhaul routers between elements like the P-CSCF, S-CSCF, IPSM GW, and SMPP GW. The P-CSCF transfers the SIP message to the S-CSCF. The S-CSCF authorizes and routes the SIP message having the WPS IPSM to the IPSM GW.

To deliver the WPS IPSM to NFVI 730 which serves UE 710, the IPSM GW generates a new SIP INVITE message that is addressed to the SMPP GW in NFVI 730. The IPSM GW in NFVI 430 may use a Short Message Service Center (SMSC) for SIP message routing and generation between SMPP GWs. The new SIP message has the WPS IPSM, WPS header, DSCP mark, and possibly the PANI header with the WPS high-priority-attachment Establishment Cause and the WPS Access Class. The IPSM GW in NFVI 430 transfers the new SIP message to the IPSM GW in NFVI 730 over the SMPP GWs in NFVI 430 and NFVI 730 and the N6 link.

To deliver the IPSM to 5GNR UE 710, the IPSM GW in NFVI 730 generates another SIP message that is addressed to 5GNR UE 710. The IPSM GW in NFVI 730 may use an SMSC for SIP message routing and generation. The other SIP message has the WPS IPSM, WPS header, DSCP mark, and possibly the PANI header with the WPS high-priority-attachment Establishment Cause and the WPS Access Class. The IPSM GW in NFVI 730 transfers the other SIP message to the S-CSCF in NFVI 730. The S-CSCF transfers the other SIP message to the P-CSCF in NFVI 730. The P-CSCF in NFVI 730 transfers the other SIP message to 5GNR UE 7101 over the IMS bearer between 5GNR UE 710 and the P-CSCF in NFVI 730. The IPSM application in 5GNR UE 410 displays the WPS message to the user of UE 710.

In NFVI 430 and NFVI 730, the P-CSCFs, S-CSCFs, IPSM GWs, and SMPP GWs handle the WPS SIP messages with WPS QoS based on the priority header and the DSCP mark. 5GNR UE 410 and 5GNR UE 710 add the priority header and the DSCP mark to SIP response messages. The P-CSCFs, S-CSCFs, IPSM GWs, and SMPP GWs in NFVI 430 and NFVI 730 handle the response SIP messages with the WPS QoS based on the priority header and the DHCP mark in the responses.

The WPS high-priority-attachment Establishment Cause is also used for WPS voice or video calls. On a WPS voice/video call, UE 410, generates a SIP INVITE message to place the call that includes the *272 WPS calling prefix and the WPS high-priority-attachment Establishment Cause. The P-CSCF uses both the *272 WPS calling prefix and the WPS high-priority-attachment Establish Cause to distinguish between a true WPS call and a malicious call. NFVI 430 handles the high-priority messages with high-priority QoS. The P-CSCF discards malicious messages that omit either the *272 WPS calling prefix or the WPS high-priority-attachment Establish Cause.

The wireless data network circuitry described above comprises computer hardware and software that form special-purpose network circuitry to transfer messages using a high-priority QoS—possibly critical WPS messages. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to transfer messages using a high-priority QoS—possibly critical WPS messages.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to transfer a user message to a message destination using a priority Quality-of-Service (QoS), the method comprising:
   a wireless User Equipment (UE) generating a Session Initiation Protocol (SIP) message that comprises a P-Access-Network Info (PANI) header and the user message, wherein the PANI header indicates the priority QoS and an establishment cause and the user message indicates the message destination;
   the wireless UE wirelessly transferring the SIP message to the wireless network;
   the wireless network wirelessly receiving the SIP message from the UE;
   the wireless network transferring the SIP message to a message network; and
   the message network receiving the SIP message, and in response to the priority QoS and the establishment cause indicated in the PANI header, generating and transferring another SIP message using the priority QoS and the establishment cause, wherein the other SIP message comprises another PANI header and the user message.

2. The method of claim 1 further comprising:
   the wireless network receiving the other SIP message that comprises the user message from the message network and wirelessly transferring the other SIP message to another wireless UE that comprises the message destination; and
   the other wireless UE wirelessly receiving the other SIP message that comprises the user message.

3. The method of claim 1 wherein:
   the wireless UE comprises a Fifth Generation New Radio (5GNR) UE;
   the wireless network comprises a 5GNR network; and
   the message network comprises an Internet Protocol Multimedia Subsystem (IMS).

4. The method of claim 1 wherein:
   the wireless UE comprises a Fifth Generation New Radio (5GNR) UE;
   the wireless network comprises a 5GNR access node; and
   the message network comprises a Proxy Call State Control Function (P-CSCF).

5. The method of claim 1 wherein:
   the user message comprises a Wireless Priority Service (WPS) message; and
   the priority QoS comprises a WPS QoS.

6. The method of claim 1 wherein:
   the wireless UE wirelessly transferring the SIP message to the wireless network comprises using a priority access class; and
   the wireless network wirelessly receiving the SIP message from the UE comprises using the priority access class.

7. The method of claim 1 wherein:
   the wireless UE wirelessly transferring the SIP message to the wireless network comprises using access class 14; and
   the wireless network wirelessly receiving the SIP message from the UE comprises using the access class 14.

8. The method of claim 1 wherein:
   the establishment cause comprises a priority establishment cause;
   the wireless UE wirelessly transferring the SIP message to the wireless network comprises using the priority establishment cause; and
   the wireless network wirelessly receiving the SIP message from the UE comprises using the priority establishment cause.

9. The method of claim 1 wherein:
   the establishment cause comprises an emergency establishment cause;
   the wireless UE wirelessly transferring the SIP message to the wireless network comprises using the emergency establishment cause; and
   the wireless network wirelessly receiving the SIP message from the UE comprises using the emergency establishment cause.

10. The method of claim 1 wherein:
    the wireless UE comprises a Long Term Evolution (LTE) UE;
    the wireless network comprises an LTE network; and
    the message network comprises an Internet Protocol Multimedia Subsystem (IMS).

11. A wireless communication system to transfer a user message to a message destination using a priority Quality-of-Service (QoS), the wireless communication system comprising:
    a wireless User Equipment (UE) configured to generate a Session Initiation Protocol (SIP) message that comprises a P-Access-Network Info (PANI) header and the user message, wherein the PANI header indicates the priority QoS and an establishment cause and the user message indicates the message destination;

the wireless UE configured to wirelessly transfer the SIP message to the wireless network;

the wireless network configured to wirelessly receive the SIP message from the UE;

the wireless network configured to transfer the SIP message to a message network; and the message network configured to receive the SIP message, and in response to the priority QoS and the establishment cause indicated in the PANI header, generate and transfer another SIP message using the priority QoS and the establishment cause, wherein the other SIP message comprises another PANI header and the user message.

12. The wireless communication system of claim 11 further comprising:

the wireless network configured to receive the other SIP message that comprises the user message from the message network and wirelessly transfer the other SIP message to another wireless UE that comprises the message destination; and the other wireless UE configured to wirelessly receive the other SIP message that comprises the user message.

13. The wireless communication system of claim 11 wherein:

the wireless UE comprises a Fifth Generation New Radio (5GNR) UE;

the wireless network comprises a 5GNR network; and the message network comprises an Internet Protocol Multimedia Subsystem (IMS).

14. The wireless communication system of claim 11 wherein:

the wireless UE comprises a Fifth Generation New Radio (5GNR) UE;

the wireless network comprises a 5GNR access node; and the message network comprises a Proxy Call State Control Function (P-CSCF).

15. The wireless communication system of claim 11 wherein:

the user message comprises a Wireless Priority Service (WPS) message; and the priority QoS comprises a WPS QoS.

16. The wireless communication system of claim 11 wherein:

the wireless UE is configured to wirelessly transfer the SIP message to the wireless network using a priority access class; and the wireless network is configured to wirelessly receive the SIP message from the UE using the priority access class.

17. The wireless communication system of claim 11 wherein:

the wireless UE is configured to wirelessly transfer the SIP message to the wireless network using access class 14; and the wireless network is configured to wirelessly receive the SIP message from the UE using the access class 14.

18. The wireless communication system of claim 11 wherein:

the establishment cause comprises a priority establishment cause;

the wireless UE is configured to wirelessly transfer the SIP message to the wireless network using the priority establishment cause; and the wireless network is configured to wirelessly receive the SIP message from the UE using the priority establishment cause.

19. The wireless communication system of claim 11 wherein:

the establishment cause comprises an emergency establishment cause;

the wireless UE is configured to wirelessly transfer the SIP message to the wireless network using the emergency establishment cause; and the wireless network is configured to wirelessly receive the SIP message from the UE using the emergency establishment cause.

20. The wireless communication system of claim 11 wherein:

the wireless UE comprises a Long Term Evolution (LTE) UE;

the wireless network comprises an LTE network; and the message network comprises an Internet Protocol Multimedia Subsystem (IMS).

* * * * *